July 19, 1932. C. W. THARP 1,868,123
LEVELER
Filed March 23, 1931 2 Sheets-Sheet 1
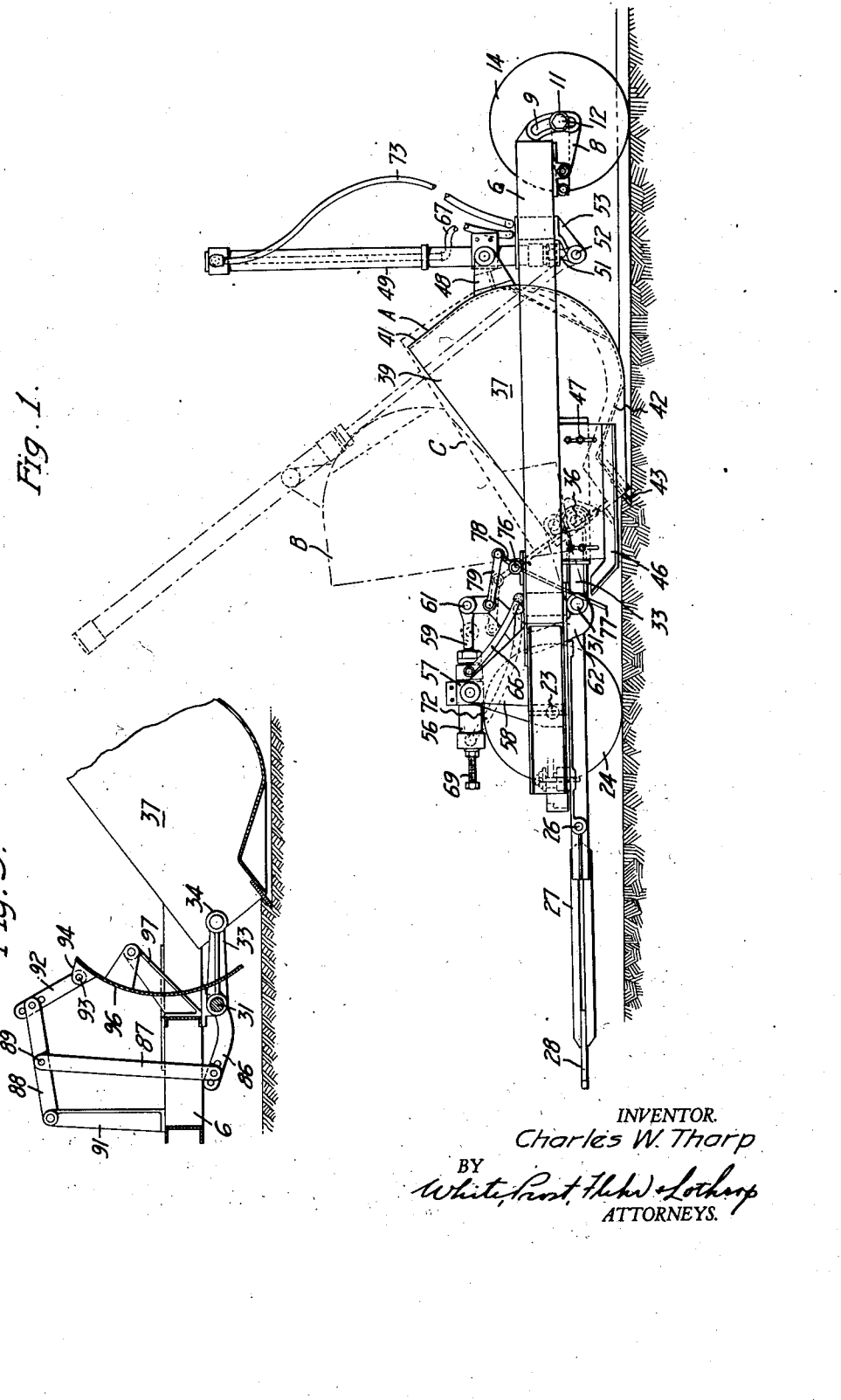
INVENTOR.
Charles W. Tharp
BY
ATTORNEYS.

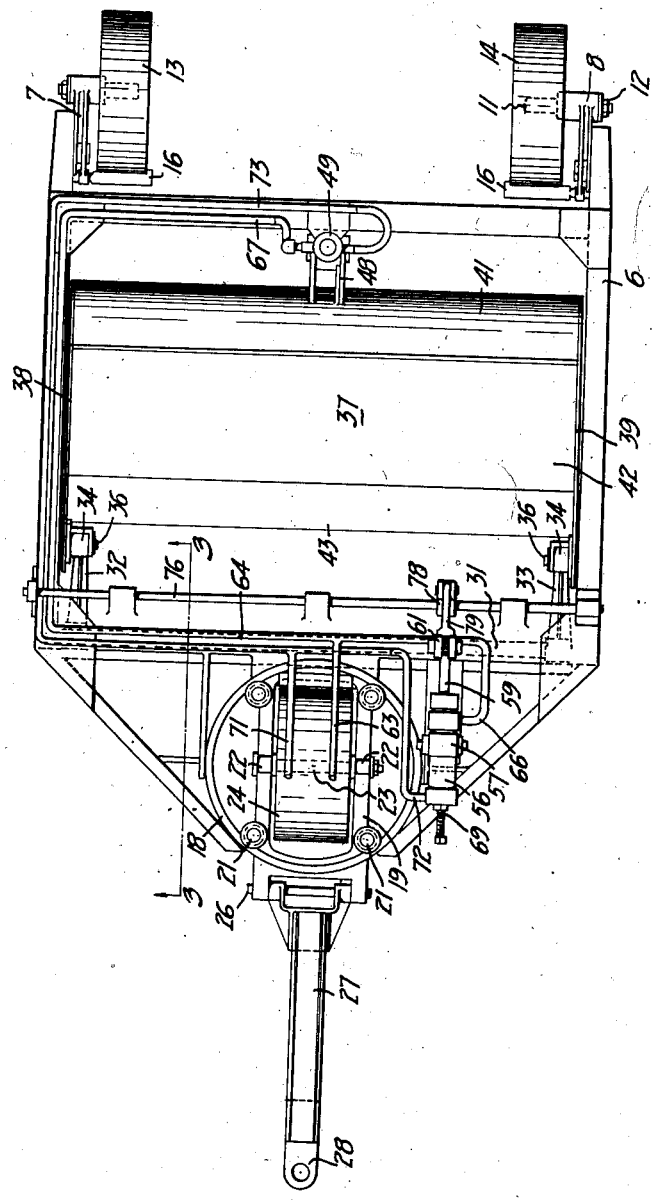

Patented July 19, 1932

1,868,123

UNITED STATES PATENT OFFICE

CHARLES W. THARP, OF WATSONVILLE, CALIFORNIA

LEVELER

Application filed March 23, 1931. Serial No. 524,492.

My invention relates to mechanism primarily useful in levelling earth and to earth moving machinery in general.

An object of my invention is to provide a leveler which requires a minimum amount of supervision in use.

Another object of my invention is to provide a leveler which is capable not only of removing earth but also of transporting earth and of subsequently dumping or discharging the transported earth.

Another object of my invention is to provide a leveler which can be operated by the operator of a draft machine such as a tractor without the operator leaving his seat on the tractor.

The foregoing and other objects are attained in the embodiment of the invention shown in the drawings, in which Figure 1 is a side elevation of a leveler constructed in accordance with my invention, the full line position of the scoop indicating the leveler as it is used in removing earth and the broken line position of the scoop indicating the leveler as it is discharging earth.

Figure 2 is a plan of the leveler shown in Figure 1.

Figure 3 is a detail showing, in cross section on the line 3—3 of Figure 2, a modified form of plate mechanism.

In general the leveler of my invention comprises a framework on which a scoop is movably mounted together with a pair of hydraulically actuated mechanisms for moving the scoop as desired with respect to the framework.

In the form of leveler disclosed in the drawings, there is provided a generally rectangular framework 6 conveniently fabricated of the usual structural shapes such as I-beams and angle irons. The framework is extended rearwardly for the attachment of sectors 7 and 8 each of which is pierced by an arcuate slot 9. Operable in each slot 9 is an axle 11 which ordinarily is clamped in any adjusted position by means of a nut 12. On the inner extremities of the axles 11 ground engaging wheels 13 and 14 are mounted for rotation. On a forward extension of the sectors 7 and 8 scrapers 16 are provided for removing earth or other matter adhering to the surface of the wheels 13 and 14. By virtue of the adjustment provided the framework 6 can be spaced at any desired distance, within the range of the mechanism, from the surface of the ground.

The forward end of the framework 6 is of generally triangular shape in plan and includes a ring 18 within which a frame 19 is rotatable by virtue of anti-friction bearings 21. Mounted in journals 22 on the frame 19 is an axle 23 carrying a forward ground engaging wheel 24. A forward extension of the frame 19 carries a pin 26 to which a tongue 27 is pivotally attached. The forward end of the tongue is equipped with a draft connection 28 for attachment to any suitable draft instrument such as a tractor. As the tongue 27 deviates from straight ahead position due to movement of the draft implement the frame 19 is rotated and steers the ground engaging wheel 24 to guide the main framework 6.

Mounted on the framework 6 by means of suitable bearings is a cross shaft 31 to opposite ends of which support arms 32 and 33 are rigidly affixed. At their trailing ends the support arms are provided with bosses 34 through which pivot pins 36 extend. The pivot pins serve as means of attaching pivotally to the arms 32 and 33 a scoop generally designated 37. The scoop includes a pair of end plates 38 and 39, a back plate 41 and a bottom plate 42 and, if desired, a scraping or cutting edge 43. In some constructions the back plate 41 and the bottom plate 42 are integral but the fabrication of the scoop in general is varied to accord with varying operating conditions. The relationship of the arms 32 and 33 to the scoop 37 is such that as the cross shaft 31 is rotated the forward end of the scoop is raised and lowered with respect to the framework and to the ground. Since considerable weight is imposed on the frame 6 adjacent the forward end of the scoop I prefer to supply additional support to the frame at this location by means of runners 46 which are mounted adjustably as at 47 on the framework 6.

The rear end of the scoop 37 is provided with extensions 48 which are pivotally attached to a hydraulic cylinder 49. The cylinder encompasses a hydraulic piston 51 at its lower end attached pivotally as at 52 to a bracket 53 secured to the framework 6. When the hydraulic expansible chamber thus provided is in contracted position the scoop is in approximately the position shown in full lines A in Figure 1 while when the hydraulic chamber is expanded the scoop is in substantially the position shown by the broken line B in Figure 1.

Since I desire to co-ordinate the movement of both the forward and rearward ends of the scoop with respect to the frame and to render the control of such movement simple, I preferably locate a hydraulic cylinder 56 at the forward portion of the framework 6. The cylinder is pivoted by trunnions 57 in a bracket 58 mounted on the framework 6 and encompasses a piston 59 pivoted as at 61 to an arm 62 mounted securely on the cross shaft 31 and when considered with the arms 32 and 33 forming therewith a bell crank. When the hydraulically expansible chamber provided by the cylinder 56 and the piston 59 is contracted the forward end of the scoop 37 is raised with respect to the framework or the ground while when the hydraulically expansible chamber is expanded the forward end of the scoop 37 is lowered with respect to the framework or the ground.

In utilizing the leveler of my invention, I have found that after the scoop has been filled with earth and is in the filling position shown by the full lines A in Figure 1 it is desirable first to lift the forward end of the scoop so that the earth contained therein can be transported, if desired, and subsequently to lift the rearward end of the scoop in order to discharge the contained earth therefrom. To effect such movement by a simple control I provide hydraulic lines communicating with a source of hydraulic fluid under pressure and with the cylinders 56 and 49. For example, a conduit 63 extends from a tractor or other draft device and from a valve-controlled source of hydraulic fluid under pressure to a branched conduit 64 on the framework 6. One branch 66 of the conduit communicates with the hydraulic cylinder 56 while the other branch 67 of the conduit communicates with the hydraulic cylinder 49. If the cylinders 56 and 49 are of equal effect upon the forward and rearward ends respectively of the scoop 37 the scoop will be lifted bodily with both ends simultaneously being spaced from the ground an equivalent amount. Since it is desirable first to lift the forward end of the scoop, I arrange that the forward cylinder 56 is of relatively large effect while the rearward cylinder 49 is of relatively small effect. This is accomplished in the present instance by making the cylinder 56 somewhat larger in diameter than the cylinder 49 although it can equally well be accomplished by varying the leverage due to the bell crank formed by the arms 62 and the arms 32 and 33.

Admission of fluid under pressure to the conduit 63 displaces the piston 59 in the cylinder 56 so that the cross shaft 31 is rotated in an anti-clockwise direction as shown in Figure 1. This is effective to raise the forward end of the scoop until the piston 59 strikes an adjustable stop 69 in the forward end of cylinder 56. This primary or preliminary movement of the piston 59 is due to the greater area of the cylinder 56 and occurs prior to the time that the hydraulic pressure on the cylinder 49 is sufficient to drive the cylinder upwardly with respect to the piston 51 and thereby lift the rearward end of the scoop 37. Since the stop 69 is adjustable, the forward end of the scoop can be lifted any desired amount just prior to the lifting of the rearward end of the scoop. To return the scoop to scraping position the conduit 63 is subjected to substantially atmospheric pressure while hydraulic fluid under super-atmospheric pressure is admitted to a conduit 71 which is preferably valve controlled and extends from the source of hydraulic fluid with which the conduit 63 is connected. The fluid flows through conduit 71 into a branch 72 connected with the cylinder 56 and a branch 73 connected with the cylinder 49 so that the scoop is thereby returned to lower or scraping position.

By suitable operation of this mechanism the operator can first lift the forward end of the scoop and then by closing the valve on the conduit 63 can hold the scoop in this position without immediately raising the rearward end of the scoop. This is the position as shown by the dotted lines indicated as C in Figure 1 and is the carrying position. With the scoop in this location earth can be transported any desired distance before additional fluid is admitted to the conduit 73 and the scoop is thereby discharged.

As an adjunct to the scoop 37 and primarily to assist in carrying material I provide a cross shaft 76 which is suitably journalled on the framework 6. Mounted on the cross shaft for pivotal movement therewith is a plate 77 which can be of any desired contour to co-operate with the forward or open end of the scoop 37. From the cross shaft 76 an extension 78 is pivoted to a link 79 pivoted to the arm 62 so that upon movement of the arm 62 clockwise, as shown in Figure 1, the plate 77 is moved away from or out of cooperating position with the scoop 37 while when the arm 62 is moved counter-clockwise, as shown in Figure 1, the plate 77 is moved into co-operating position with the scoop and closes the open end of the scoop so that dirt or earth can be carried therein. When the scoop is elevated by the cylinder 49 to discharging position, the scoop moves away from the plate 77 and the contents thereof are easily discharged.

The modified form of plate mechanism shown in Figure 3 is for use in place of the plate 77. Fixed on the cross shaft 31 is an arm 86 pivoted to a link 87 fastened to a lever 88 by a pin 89. The lever 88 at one end is pivoted to a standard 91 mounted on the framework 6 and at the other end is pivoted to a link 92 joined by a pin 93 to a bracket 94 on a blade 96. The blade is rotatably mounted on arms 97 fixed on the framework 6.

When the shaft 31 is rotated to lift the forward end of the scoop 37, the arm 86 turns therewith and, through the link 87 and the lever 88, causes the link 92 to rotate the blade 96 and the arms 97 as a unit to close the open end of the scoop.

In general the leveler of my invention comprises a relatively simple mechanism which is hydraulically controlled from a remote point usually on a draft implement such as a tractor in such a fashion that the earth carrying scoop can be positioned in a scraping position, in earth carrying position or in discharging position simply by controlling the flow of hydraulic fluid through two conduits. Furthermore, a plate is coöperably associated with the scoop to assist in retaining earth or similar material in the scoop when such material is to be transported.

It is to be understood that I do not limit myself to the form of the leveler shown and described herein, as the invention, as set forth in the following claims may be embodied in a plurality of forms.

I claim:

1. A leveler comprising a framework, a scoop, links pivoted to the forward end of said scoop and to said framework, hydraulic means for actuating said links for raising and lowering said scoop, a hydraulically expansible chamber interposed between the rear end of said scoop and said framework, and a hydraulic conduit connecting said hydraulic means and said hydraulically expansible chamber.

2. A leveler comprising a framework, a scoop mounted on said framework for movement relative thereto, a hydraulically expansible chamber interposed between one end of said scoop and said framework, hydraulically actuated linkage interposed between the other end of said scoop and said framework, and a hydraulic conduit interconnecting said hydraulically expansible chamber and said hydraulically actuated linkage.

3. A leveler comprising a framework, a cross shaft rotatably mounted in said framework, a scoop, arms on said shaft pivotally connected to said scoop, hydraulic means for rotating said shaft, a hydraulically expansible chamber interposed between said scoop and said framework, and a hydraulic conduit connecting said chamber and said hydraulic means.

4. A leveler comprising a framework, a hydraulic cylinder, a scoop pivotally connected to said hydraulic cylinder, a piston in said cylinder and pivotally connected to said framework, a pair of arms pivotally connected to said scoop and to said framework, a hydraulic mechanism for actuating said arms, and means for simultaneously subjecting said piston and said hydraulic mechanism to hydraulic pressure.

5. A leveler comprising a framework, a scoop, hydraulic means for adjusting one end of said scoop with respect to said framework, a plate adapted to be moved to overlie the other end of said scoop, and hydraulic means for adjusting said other end of said scoop and for moving said plate.

6. A leveler comprising a rectangular framework, a cross shaft pivotally mounted in said framework, a pair of arms on said cross shaft, a scoop pivoted to said arms, a lever on said cross shaft, a piston pivoted to said lever, a hydraulic cylinder encompassing said piston and pivoted to said framework, an adjustable stop in said cylinder, a second hydraulic cylinder pivoted to said scoop, a second piston in said second cylinder and pivoted to said framework, and a hydraulic conduit connecting said first and second cylinders.

In testimony whereof, I have hereunto set my hand.

CHARLES W. THARP.